United States Patent
Kikuchi et al.

(10) Patent No.: US 12,192,632 B2
(45) Date of Patent: Jan. 7, 2025

(54) INSTALLATION ASSISTANCE APPARATUS, INSTALLATION ASSISTANCE METHOD, AND NON-TRANSITORY COMPUTER-READABLE STORAGE MEDIUM

(71) Applicant: NEC Corporation, Tokyo (JP)

(72) Inventors: Katsumi Kikuchi, Tokyo (JP); Soma Shiraishi, Tokyo (JP); Yu Nabeto, Tokyo (JP); Takami Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 78 days.

(21) Appl. No.: 17/924,745

(22) PCT Filed: May 21, 2020

(86) PCT No.: PCT/JP2020/020054
§ 371 (c)(1),
(2) Date: Nov. 11, 2022

(87) PCT Pub. No.: WO2021/234890
PCT Pub. Date: Nov. 25, 2021

(65) Prior Publication Data
US 2023/0188855 A1 Jun. 15, 2023

(51) Int. Cl.
*H04N 23/695* (2023.01)
*H04N 23/56* (2023.01)
*H04N 23/74* (2023.01)

(52) U.S. Cl.
CPC ........... *H04N 23/695* (2023.01); *H04N 23/56* (2023.01); *H04N 23/74* (2023.01)

(58) Field of Classification Search
CPC ...... H04N 23/695; H04N 23/56; H04N 23/74; H04N 23/90; H04N 23/60; G03B 15/00; Y02B 20/40
See application file for complete search history.

(56) References Cited

U.S. PATENT DOCUMENTS 9,280,936 B2 * 3/2016 Delfs .................. G09G 3/3406
9,445,081 B1 * 9/2016 Kouperman ............ G06T 15/00
(Continued)

FOREIGN PATENT DOCUMENTS

JP 2009-010728 A 1/2009
JP 2011-095131 A 5/2011
(Continued)

OTHER PUBLICATIONS

International Search Report for PCT Application No. PCT/JP2020/020054, mailed on Aug. 25, 2020.

*Primary Examiner* — Twyler L Haskins
*Assistant Examiner* — John H Morehead, III
(74) *Attorney, Agent, or Firm* — Sughrue Mion, PLLC

(57) ABSTRACT

An installation assistance apparatus (100) includes a first image capture unit and a second image capture unit that are placed in such a way as to face each other in a plan view, an acquisition unit (102) acquiring a first image from the first image capture unit, a detection unit (104) detecting a position of at least part of the second image capture unit in the first image by processing the first image, a determination unit (106) determining whether the position of the second image capture unit satisfies a criterion, and an output processing unit (108) causing a determination result by the determination unit (106) to be output.

18 Claims, 16 Drawing Sheets

(56) References Cited

U.S. PATENT DOCUMENTS

| | | | | |
|---|---|---|---|---|
| 2012/0044373 A1* | 2/2012 | Shiozaki | ............... | H04N 23/90 |
| | | | | 348/E5.045 |
| 2015/0029350 A1* | 1/2015 | Matsuda | ............... | H04N 23/90 |
| | | | | 348/211.2 |
| 2018/0195974 A1* | 7/2018 | Kress | ..................... | H04N 7/181 |
| 2018/0324363 A1* | 11/2018 | Wada | ................... | H04N 5/2224 |
| 2019/0199907 A1* | 6/2019 | Daulton | ............... | H04N 23/631 |
| 2020/0336631 A1* | 10/2020 | Biasini | .................. | H04N 23/62 |
| 2021/0266451 A1* | 8/2021 | Takahashi | .............. | H04N 23/90 |
| 2023/0048407 A1* | 2/2023 | Shiraishi | ............. | G06V 10/147 |

FOREIGN PATENT DOCUMENTS

| | | |
|---|---|---|
| JP | 2016-123004 A | 7/2016 |
| JP | 2018-157254 A | 10/2018 |
| JP | 2019-160327 A | 9/2019 |
| WO | 2019/030235 A1 | 2/2019 |

\* cited by examiner

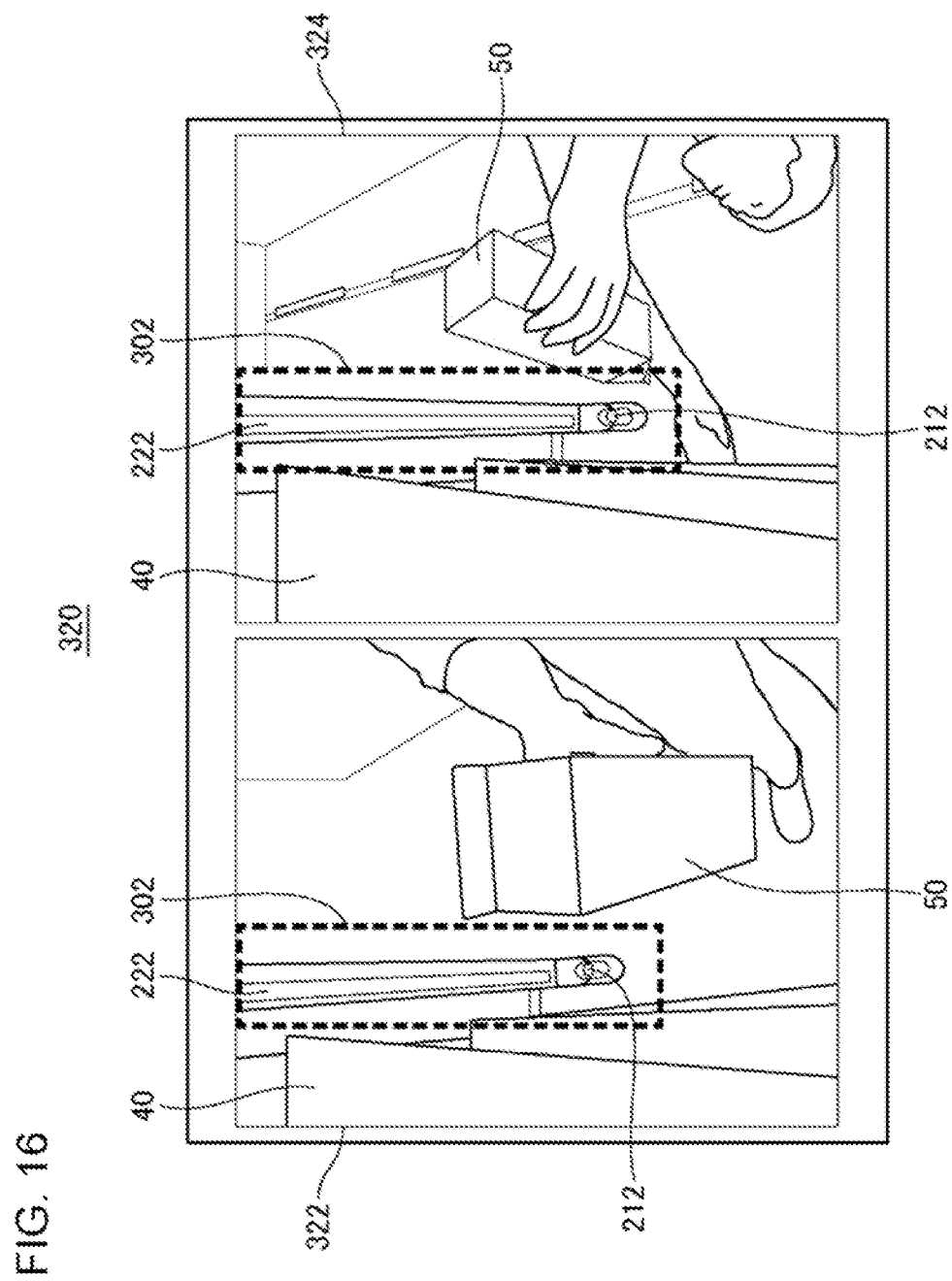

INSTALLATION ASSISTANCE APPARATUS, INSTALLATION ASSISTANCE METHOD, AND NON-TRANSITORY COMPUTER-READABLE STORAGE MEDIUM

This application is a National Stage Entry of PCT/JP2020/020054 filed on May 21, 2020, the contents of all of which are incorporated herein by reference, in their entirety.

TECHNICAL FIELD

The present invention relates to an installation assistance apparatus, an installation assistance method, and a program.

BACKGROUND ART

Determination of an article such as a product by using an image is performed in various locations. Patent Document 1 describes an example of a system determining a product displayed in a storefront. The system uses an image recognition technology on an image in which a display shelf is captured, based on a sample image of a product. When the surface of a product package reflects light, in-store lighting, outdoor light, or the like becomes a factor adversely affecting recognition precision due to the light being captured on the surface of the product according to the relative position to an image capture apparatus and preventing acquisition of an original image feature value.

Patent Document 1 describes changing the relative position between the product and a light source such as lighting and capturing an image of the product a plurality of times without changing the relative position between the product and the image capture apparatus, and acquiring sample image information by combining parts of pieces of image information captured at the respective positions, light not being captured in the parts, in order to solve the issue of captured light.

Further, Patent Document 2 describes an image processing method for determining an occlusion area of a three-dimensional target object by extracting a variation area of luminance values observed in an image, the area being problematic when the three-dimensional form of the target object is measured. In Patent Document 2, two cameras are placed in such a way as to incline toward a target object in different directions and two lighting apparatuses are also placed in such a way as to incline toward the target object in different directions. Then, a variation area of luminance values is extracted by using a plurality of images acquired by changing irradiation of the target object by turning on/off the two lighting apparatuses, and capturing images of the target object with the two cameras.

RELATED DOCUMENTS

Patent Documents

Patent Document 1: Japanese Patent Application Publication No. 2019-160327
Patent Document 2: Japanese Patent Application Publication No. 2011-95131

SUMMARY OF INVENTION

Technical Problem

The present inventors have examined installing two units in combination, lighting and a camera being integrated into each unit, and determining an object in a three-dimensional space by using images captured by the two cameras. In this case, the installation positions of the two units need to be aligned, and the adjustment work requires time and effort.

The present invention has been made in view of the aforementioned circumstances, and an object thereof is to facilitate adjustment work when two units are installed in combination, lighting and a camera being integrated into each unit.

Solution to Problem

In order to solve the aforementioned issues, the following configurations are employed in aspects of the present invention, respectively.

A first aspect relates to an installation assistance apparatus.

An installation assistance apparatus according to the first aspect includes:
  an acquisition unit that acquires a first image from a first image capture apparatus out of the first image capture apparatus and a second image capture apparatus that are placed in such a way as to face each other in a plan view;
  a detection unit that detects a position of at least part of the second image capture apparatus in the first image by processing the first image;
  a determination unit that determines whether the position of the second image capture apparatus satisfies a criterion; and
  an output processing unit that causes a determination result by the determination unit to be output.

A second aspect relates to an installation assistance method executed by at least one computer.

An installation assistance method according to the second aspect includes:
  acquiring a first image from a first image capture apparatus out of the first image capture apparatus and a second image capture apparatus that are placed in such a way as to face each other in a plan view;
  detecting a position of at least part of the second image capture apparatus in the first image by processing the first image;
  determining whether the position of the second image capture apparatus satisfies a criterion; and
  causing the determination result to be output.

Note that another aspect of the present invention may be a program causing at least one computer to execute the method according to the aforementioned second aspect or may be a computer-readable storage medium on which such a program is recorded. The storage medium includes a non-transitory tangible medium.

The computer program includes a computer program code causing a computer to implement the installation assistance method on the installation assistance apparatus when being executed by the computer.

Note that any combination of the components described above, and representations of the present invention converted among a method, an apparatus, a system, a storage medium, a computer program, and the like are also valid as embodiments of the present invention.

Further, various components of the present invention do not necessarily need to be individually independent, and, for example, a plurality of components may be formed as a single member, a plurality of members may form a single component, a certain component may be part of another component, and part of a certain component may overlap with part of another component.

Further, while a plurality of procedures are described in a sequential order in the method and the computer program according to the present invention, the order of description does not limit the order in which the plurality of procedures are executed. Therefore, when the method and the computer program according to the present invention are implemented, the order of the plurality of procedures may be changed without affecting the contents.

Furthermore, a plurality of procedures in the method and the computer program according to the present invention are not limited to be executed at timings different from each other. Therefore, for example, a certain procedure may be executed during execution of another procedure, and an execution timing of a certain procedure and an execution timing of another procedure may overlap with each other in part or in whole.

Advantageous Effects of Invention

Each of the aforementioned aspects enables facilitation of adjustment work when two units are installed in combination, lighting and a camera being integrated into each unit.

BRIEF DESCRIPTION OF THE DRAWINGS

The aforementioned object, other objects, features, and advantages will become more apparent by the following preferred example embodiments and accompanying drawings.

FIG. 16 is a diagram illustrating a display example of a screen including images of two image capture units, the screen being displayed on the operation terminal.

EXAMPLE EMBODIMENT

Example embodiments of the present invention will be described below by using drawings. Note that, in every drawing, similar components are given similar signs, and description thereof is omitted as appropriate. Further, in every diagram, a configuration of a part unrelated to the essence of the present invention is omitted and is not illustrated.

In the example embodiments, "acquisition" includes at least either of an apparatus getting data or information stored in another apparatus or a storage medium (active acquisition), and an apparatus inputting data or information output from another apparatus to the apparatus (passive acquisition). Examples of the active acquisition include making a request or an inquiry to another apparatus and receiving a response and readout by accessing another apparatus or a storage medium. Further, examples of the passive acquisition include reception of distributed (or, for example, transmitted or push notified) information. Furthermore, "acquisition" may refer to acquisition by selection from received data or information, or selective reception of distributed data or information.

First Example Embodiment

<Outline>

Figure 1:
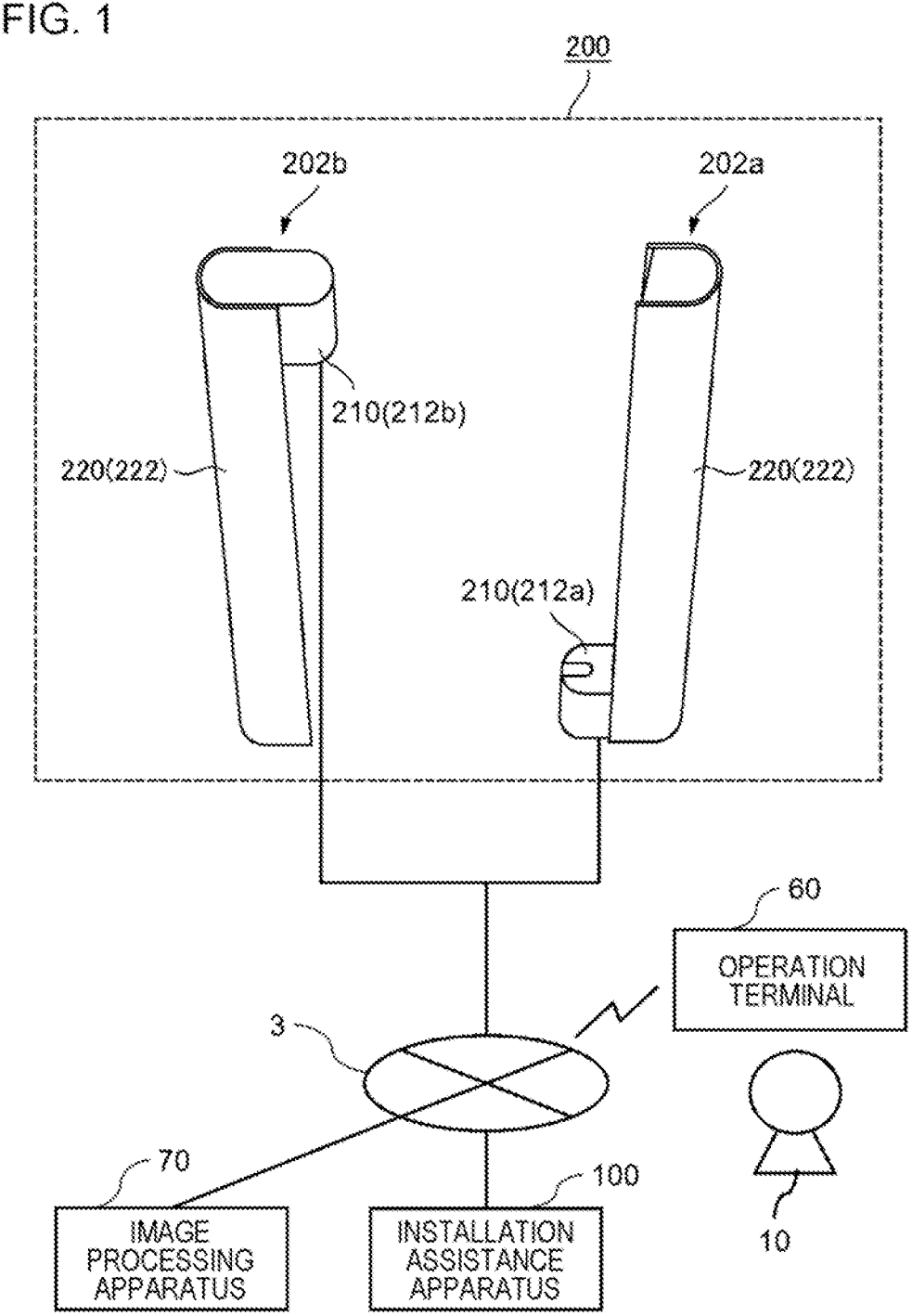
FIG. 1 is a diagram illustrating a use environment of an installation assistance apparatus according to an example embodiment of the present invention.
Figure 2:
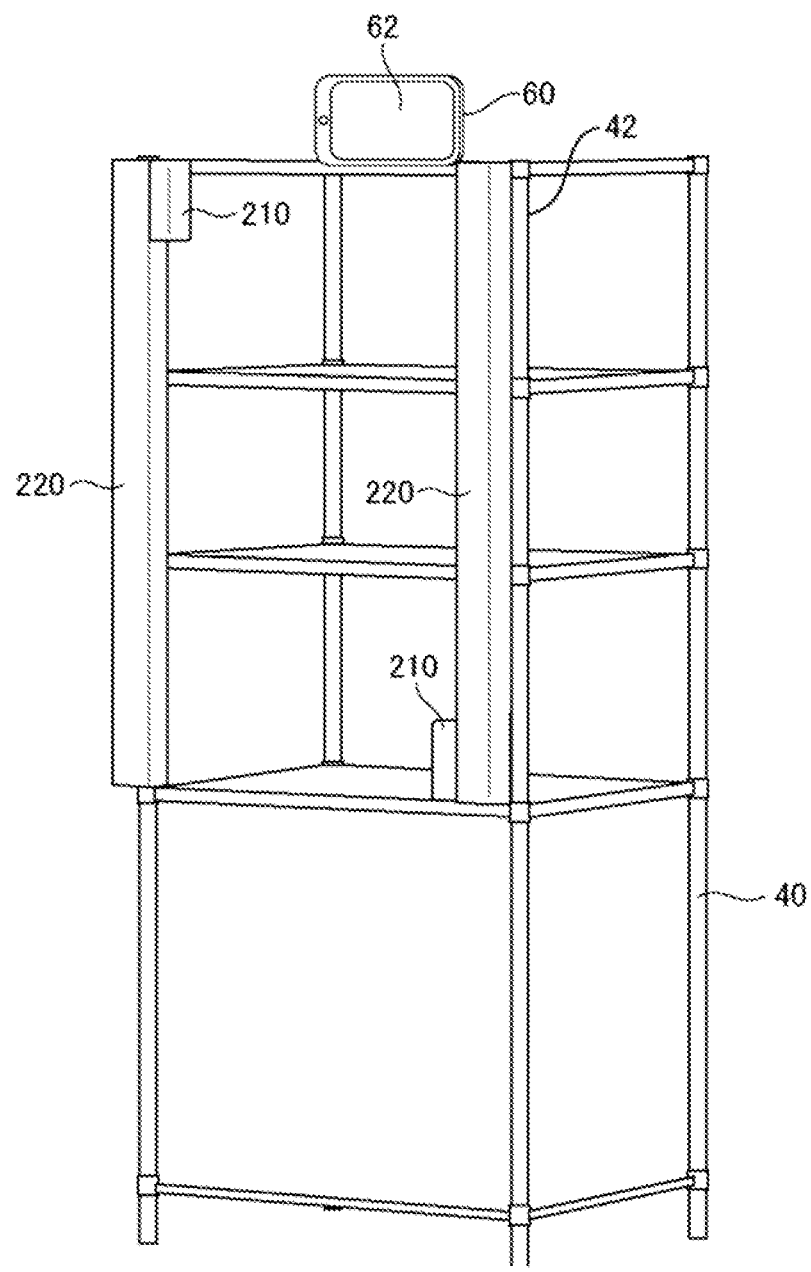
FIG. 2 is a diagram for illustrating an image capture apparatus installed and adjusted by using the installation assistance apparatus.
Figure 3:
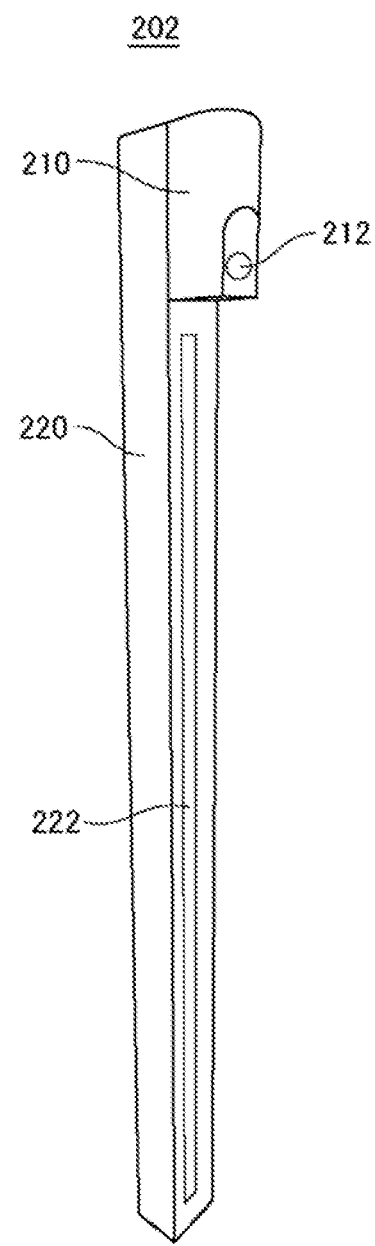
FIG. 3 is a diagram for illustrating an image capture unit constituting the image capture apparatus.

FIG. 1 is a diagram illustrating a use environment of an installation assistance apparatus 100 according to an example embodiment of the present invention. FIG. 2 is a diagram for illustrating an image capture apparatus 200 installed and adjusted by using the installation assistance apparatus 100. FIG. 3 is a diagram for illustrating an image capture unit 202 constituting the image capture apparatus 200.

For example, an article shelf 40 is a fixture placed in a store or a warehouse and includes at least one shelf. An article is placed on the shelf.

The image capture apparatus 200 captures an image of at least one of a shelf on the article shelf 40 and an area in front of the shelf. In an example illustrated in FIG. 2, the image capture apparatus 200 captures an image of both a shelf on the article shelf 40 and an area in front of the shelf. The image capture apparatus 200 is connected to an object recognition apparatus (unillustrated), and an article placed on the article shelf 40 or an article taken out from the article shelf 40 is determined by processing the image generated by the image capture apparatus 200.

As an example, the article shelf 40 is a display shelf in a store, and an article is a product. In this example, the object recognition apparatus can determine a product placed on the display shelf or a product taken out from the display shelf by processing an image generated by the image capture apparatus 200. Then, the determined product may be set as a target of payment processing.

The image capture apparatus 200 includes two image capture units 202. Each of the two image capture units 202 includes a lighting unit 222 and a camera 212. One image capture unit 202 including at least a camera 212 is an example of a first image capture apparatus (also referred to as a first image capture unit 202a or a camera 212a), and the other image capture unit 202 including at least a camera 212 is an example of a second image capture apparatus (also referred to as a second image capture unit 202b or a camera 212b). The camera 212 is housed in an image capturing unit housing 210, and the lighting unit 222 is housed in a lighting unit housing 220.

The two image capture units 202 are placed in such a way as to face each other in a plan view. When the two image capture units 202 are installed in combination, the installation assistance apparatus 100 assists correction work of misalignment between the two image capture units 202 in a horizontal direction, a vertical direction, a skew direction, a combination thereof, and the like by an operator 10, adjustment work of an image capturing direction of the camera 212 by the operator 10, and the like.

The operator 10 uses an operation terminal 60 on the scene of installing the image capture apparatus 200. The operation terminal 60 is connected to the installation assistance apparatus 100 through a communication network 3. For example, the operation terminal 60 may be a mobile terminal such as a tablet terminal, a smartphone, and a notebook-type personal computer. While the operation terminal 60 is placed above the article shelf 40 in the example in FIG. 2, the placement is not limited thereto. The operation terminal 60 may be operated by the operator 10 in his/her hand or may be placed at another location for use.

The operation terminal 60 is provided by a computer 1000 to be described later and may include a display unit, an operation acceptance unit, a voice input-output unit, and a vibration unit as input-output apparatuses. Examples of the display unit include a liquid crystal display, an organic electro-luminescence (EL) display, and a light emitting diode (LED) indicator. Examples of the operation acceptance unit include a touch panel, a keyboard, an operation key, an operation button, a switch, a jog dial, and a touch pad. The voice input-output unit includes a microphone and a speaker. The vibration unit is a vibrator.

The installation assistance apparatus 100 is further connected to an image processing apparatus 70 through the communication network 3. The image processing apparatus 70 may be directly connected to the installation assistance apparatus 100. Alternatively, the image processing apparatus 70 may be an apparatus separate from the installation assistance apparatus 100, an apparatus included inside the installation assistance apparatus 100, or a combination thereof.

Further, the image processing apparatus 70 may perform image processing in the object recognition apparatus. In other words, an image processing means that performs image processing in the object recognition apparatus may also serve as the image processing apparatus 70 in the installation assistance apparatus 100.

A light emitting surface of the lighting unit 222 extends in one direction and includes a light emitting unit and the lighting unit housing 220 functioning as a cover for covering the light emitting unit. The lighting unit 222 mainly emits light in a direction orthogonal to the extending direction of the light emitting surface. The light emitting unit includes a light emitting device such as a light emitting diode (LED) and emits light in a direction not covered by the cover. Note that, when the light emitting device is an LED, a plurality of LEDs are arranged in a direction in which the lighting unit 222 extends (a vertical direction in the diagram).

Then, the camera 212 is provided at one end of the lighting unit 222 and has a direction in which light of the lighting unit 222 is emitted as an image capture area. One of the two image capture units 202 is installed in such a way as to capture an image in a downward direction from the upper side, and the other is installed in such a way as to capture an image in an upward direction from the lower side.

For example, in the image capture unit 202 on the left side in FIG. 1 and FIG. 2, the camera 212 has a lower area and a diagonally lower right area as an image capture area. Further, in the image capture unit 202 on the right side in FIG. 1 and FIG. 2, the camera 212 has an upper area and a diagonally upper left area as an image capture area. In FIG. 1, the image capture unit 202 on the right side installed in such a way that the camera 212 is positioned on the lower side is also referred to as a first image capture unit 202a. In FIG. 1, the image capture unit 202 on the left side installed in such a way that the camera 212 is positioned on the upper side is also referred to as a second image capture unit 202b. When cameras in the first image capture unit 202a and the second image capture unit 202b are distinguished, the cameras are also referred to as a camera 212a and a camera 212b, respectively. Furthermore, an image generated by the camera 212a in the first image capture unit 202a is referred to as a first image, and an image generated by the camera 212b in the second image capture unit 202b is referred to as a second image.

The camera 212 includes a lens and an imaging element such as a charge coupled device (CCD) image sensor. The camera 212 is installed through adjustment of the orientations of the camera body and the lens, an angle of view, a zoom magnification, focusing, and the like.

An image generated by the camera 212 is captured and is transmitted to the installation assistance apparatus 100 preferably in real time. Note that images transmitted to the installation assistance apparatus 100 may not be directly transmitted from the camera 212 and may be images delayed by a predetermined time. Images captured by the camera 212 may be temporarily stored in a separate storage apparatus and be read from the storage apparatus by the installation assistance apparatus 100 successively or at predetermined intervals. Furthermore, images transmitted to the installation assistance apparatus 100 are preferably dynamic images but may be frame images captured at predetermined intervals or static images.

As illustrated in FIG. 2, the two image capture units 202 are mounted on front frames 42 (or at the front of side walls on both sides) of the article shelf 40. At this time, the first image capture unit 202a is mounted on one front frame 42 and is oriented in such a way that the camera 212 is positioned in the lower part, and the second image capture unit 202b is mounted on a front frame 42 on the opposite side of the first image capture unit 202a and is oriented in such a way that the camera 212 is positioned in the upper part. Therefore, one camera 212, the article shelf 40, and the other camera 212 are arranged in this order in an extending direction of the shelf. Further, one camera 212 is positioned above shelves on the article shelf 40, and the other camera 212 is positioned below the shelves on the article shelf 40. Thus, the space between the two cameras 212 is widened.

Then, the camera 212a in the first image capture unit 202a captures an image of an area above and diagonally above the camera 212a in such a way that the image capture area includes an opening of the article shelf 40 and an area in front of the opening. On the other hand, the camera 212b in the second image capture unit 202b captures an image of a lower area and a diagonally lower area in such a way that the image capture area includes the opening of the article shelf 40 and an area in front of the opening. Such use of the two image capture units 202 enables image capture of a three-dimensional space including the opening of the article shelf 40 and the entire area in front of the opening. Therefore, by processing images generated by the image capture apparatus 200, the object recognition apparatus can determine an article taken out from the article shelf 40.

Figure 4:
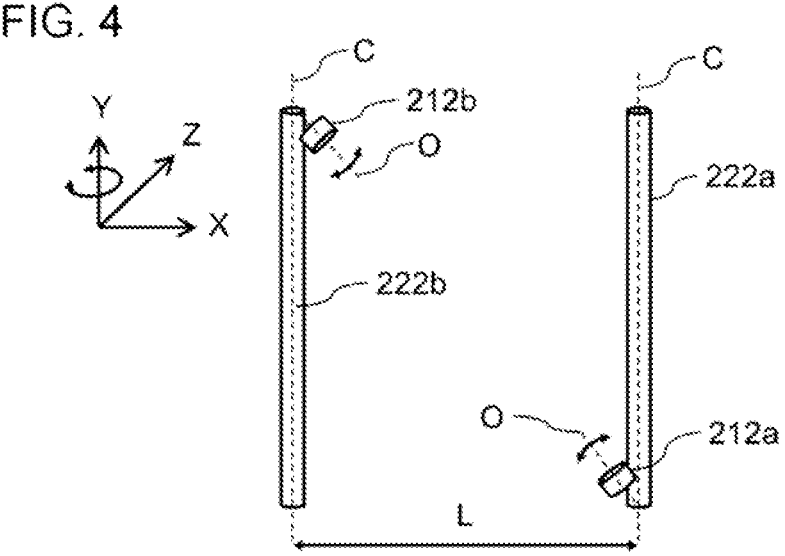
FIG. 4 is a diagram for illustrating misalignment at installation of the image capture units.

FIG. 4 is a diagram for illustrating misalignment at installation of the image capture units 202. The diagram only illustrates the lighting units 222 in the image capture units 202. For example, it is assumed that a vertical direction of the front frame 42 of the article shelf 40 represents a Y-axis direction and that a shelf board on the article shelf 40 is parallel with an XZ-plane. A central axis C of each of the two lighting units 222 is installed in parallel with the Y-axis.

While the image capture unit 202 is, for example, screwed into the front frame 42 of the article shelf 40, the relative position between the two image capture units 202 needs to be adjusted to a suitable position since the two image capture units 202 are used in combination. On the work scene, after the two image capture units 202 are temporarily mounted, the relative position is adjusted to a suitable position through correction of misalignment.

However, a direction of misalignment includes misalignment of a distance L between the two image capture units 202, and a horizontal direction (X-axis and/or Z-axis direction), a vertical direction (Y-axis direction), and a skew direction (rotative direction around the central axis C) of each image capture unit 202, and a combination thereof. Furthermore, since an image capturing direction of the camera 212 in each image capture unit 202 (such as an optical axis O) is also adjusted at installation, adjustment work of the installation positions of the two image capture units 202 has required time and effort.

<Functional Configuration Example>

Figure 5:
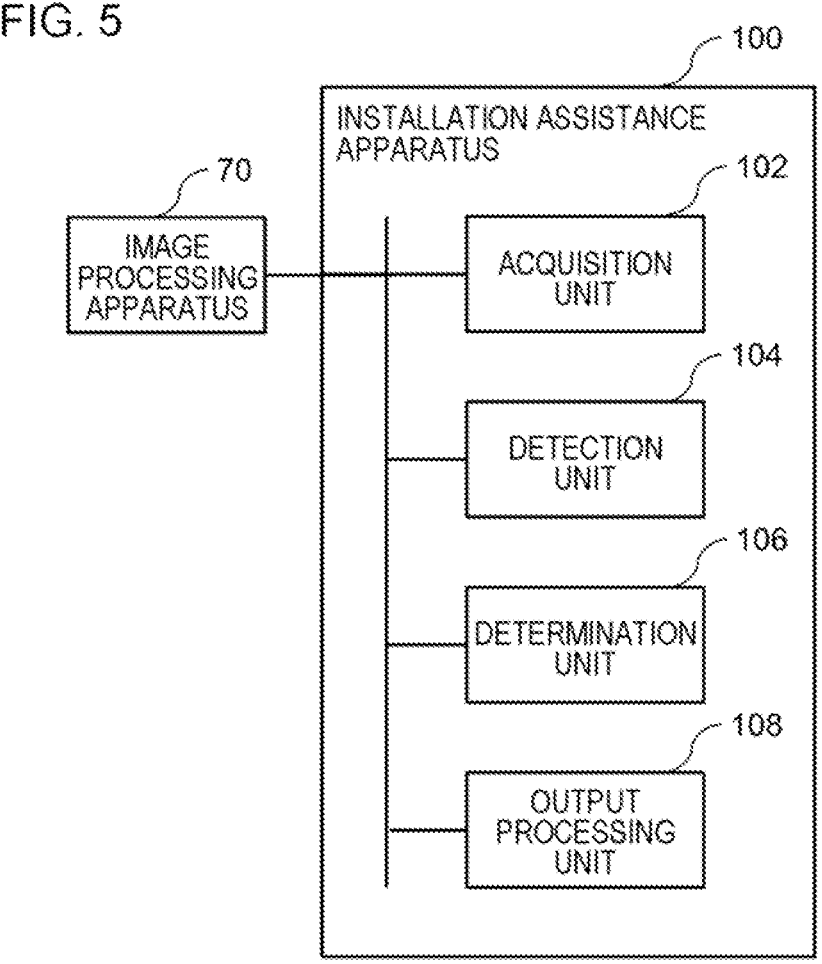
FIG. 5 is a block diagram illustrating an example of a functional configuration of the installation assistance apparatus according to the example embodiment.

The installation assistance apparatus 100 assists such adjustment work at installation of the image capture apparatus 200. FIG. 5 is a block diagram illustrating an example of a functional configuration of the installation assistance apparatus 100 according to the present example embodiment. The installation assistance apparatus 100 includes an acquisition unit 102, a detection unit 104, a determination unit 106, and an output processing unit 108.

The acquisition unit 102 acquires a first image from the first image capture unit 202a out of the two image capture units 202 facing each other in a plan view. Specifically, the acquisition unit 102 acquires a first image from the image capture unit 202 installed in such a way that the camera 212 is positioned in the lower part. The second image capture unit 202b being installed in such a way as to face the first image capture unit 202a is captured in the first image.

The detection unit 104 detects the position of at least part of the second image capture unit 202b in a first image by processing the first image. The first image generated by the first image capture unit 202a undergoes image analysis processing by the image processing apparatus 70. Specifically, for example, by pattern matching processing, the image processing apparatus 70 extracts, from the first image, an image of the lighting unit housing 220, the lighting unit 222, the image capturing unit housing 210, or the camera 212 in the image capture unit 202, or an area having a feature value matching a feature value of the image. The image processing apparatus 70 extracts an area including at least part of the lighting unit housing 220, the lighting unit 222, and the image capturing unit housing 210 in the second image capture unit 202b, and the lens of the camera 212b in the first image and also determines the position of the area in the first image.

The determination unit 106 determines whether the position of the second image capture unit 202b satisfies a criterion.

While various criteria for determining the position of the second image capture unit 202b can be considered and examples thereof are described below, the criterion is not limited thereto. Further, a plurality of the following criteria may be combined.

(a1) At least part of the lighting unit 222 and the camera 212b in the second image capture unit 202b is included in a predetermined area at a predetermined position in the first image.

(a2) The size of at least one component out of the lighting unit 222, the camera 212b, and the lens of the camera 212b in the second image capture unit 202b in the first image is included in a predetermined range related to the component.

(a3) An area of light emitted from the light emitting unit in the lighting unit 222 in the second image capture unit 202b is equal to or greater than a predetermined value. For example, when an irradiation direction of light is not facing straight toward the facing first image capture unit 202a, the area of light narrows. Therefore, the criterion is that the area of light is equal to or greater than the predetermined value in such a way that the irradiation direction of light faces straight toward the facing first image capture unit 202a.

(a4) The lens of the camera 212b in the second image capture unit 202b is included in a predetermined area at a predetermined position in the first image.

For example, the predetermined area, the predetermined range, and the predetermined value that are described above are computed based on setting conditions such as the actual size of each area, the distance between the two image capture units 202, the angle of view and the focal distance of the camera 212a in the first image capture unit 202a, and the type (the format, the size, and the resolution) of a captured image. The conditions may be input by the operator 10 by using an operation screen (unillustrated) on the operation terminal 60. Alternatively, conditions such as the angle of view and the focal distance of the camera 212a, and the type of an image may be acquired from the camera 212a. Furthermore, the installation assistance apparatus 100 may further include a control unit (unillustrated) controlling the angle of view and the focal distance of the camera 212a, based on conditions such as the angle of view and the focal distance of the camera 212a, and the type of an image that are input by the operator 10.

In the example according to the present example embodiment, the second image capture unit 202b is first fixed to the front frame 42, and the first image capture unit 202a is fixed to the front frame 42 through adjustment of the installation position of the first image capture unit 202a through monitoring of the second image capture unit 202b captured in a first image from the camera 212a in the first image capture unit 202a. Note that the first image capture unit 202a may be first fixed to the front frame 42, and the second image capture unit 202b may be fixed to the front frame 42 through adjustment of the installation position of the second image capture unit 202b through monitoring of the first image capture unit 202a captured in a second image from the camera 212b in the second image capture unit 202b.

Furthermore, the second image capture unit 202b may be first fixed to the front frame 42, and the first image capture unit 202a may be fixed to the front frame 42 through adjustment of the installation position of the first image capture unit 202a through monitoring of the first image capture unit 202a captured in a second image from the camera 212b in the second image capture unit 202b. Alternatively, the first image capture unit 202a may be first fixed to the front frame 42, and the second image capture unit 202b may be fixed to the front frame 42 through adjustment of the installation position of the second image capture unit 202b through monitoring of the second image capture unit 202b captured in a first image from the camera 212a in the first image capture unit 202a.

Furthermore, either one of the following methods may be considered as the method for adjusting the position of the image capture units 202.

(b1) Fixing the two image capture units 202 and adjusting the image capturing directions of the cameras 212, the optical axes O in FIG. 4, and the like without changing the positions of the image capture units 202.

(b2) Fixing either one of the two image capture units 202 and making an adjustment by changing the position of the other image capture unit 202.

In this example, the detection unit 104 further acquires a second image from the camera 212b in the second image capture unit 202b and, by processing the second image, detects the position of at least part of the first image capture unit 202a in the second image.

The determination unit 106 determines whether the position of the first image capture unit 202a satisfies the criterion. The output processing unit 108 outputs the determination result by the determination unit 106.

Thus, out of the two image capture units 202, which image capture unit 202 to be fixed first, which camera 212 an image from which is used in a determination result to be used, and which image capture unit 202 the installation position of which is to be adjusted can be selected in consideration of ease of work, based on the type and the form of a fixture on which the image capture apparatus 200 is installed, the installation location of the fixture, the mounting position and the mounting direction of the image capture apparatus 200, the installation interval between the two image capture units 202, the distance from another fixture or another piece of equipment, and the like.

The output processing unit 108 causes a determination result by the determination unit 106 to be output.

The determination result includes at least one type of information out of information indicating that the criterion is satisfied and information indicating that the criterion is not satisfied.

While various methods for outputting a determination result can be considered and examples thereof are described below, the method is not limited thereto. Further, a plurality of the following methods may be combined.

(c1) Causing a display 62 on the operation terminal 60 to display the determination result.

For example, when the criterion is satisfied, a message, an icon, or the like notifying installation completion is displayed, and when the criterion is not satisfied, a message, an icon, or the like notifying that adjustment is required is displayed.

(c2) Causing a speaker in the operation terminal 60 to output a voice or an alarm.

For example, when the criterion is satisfied, a message notifying installation completion is output by voice or a chime is output, and when the criterion is not satisfied, a message notifying that adjustment is required is output by voice or an alarm sound is output.

(c3) Activating a vibrator in the operation terminal 60.

For example, when the criterion is satisfied, the vibrator is activated once with a relatively long vibration, and when the criterion is not satisfied, the vibrator is repeatedly activated a plurality of times with short vibrations.

<Hardware Configuration Example>

Figure 6:
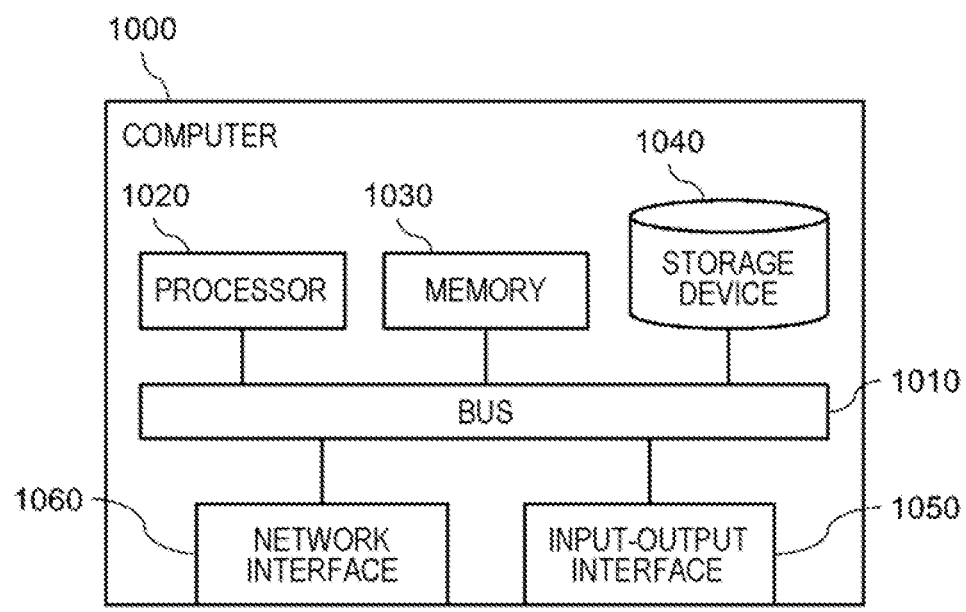
FIG. 6 is a block diagram illustrating a hardware configuration of a computer providing an installation assistance apparatus according to each example embodiment.

FIG. 6 is a block diagram illustrating a hardware configuration of a computer 1000 providing an installation assistance apparatus 100 according to each example embodiment. Examples of the installation assistance apparatus 100 include a server computer and a personal computer. Further, the operation terminal 60 and the image processing apparatus 70 are also provided by the computer 1000. Furthermore, part of the functions of the installation assistance apparatus 100 may be provided by a computer 1000 providing the operation terminal 60. Alternatively, as described above, the image processing apparatus 70 may be included in the same computer 1000 as the installation assistance apparatus 100.

The computer 1000 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from one another. Note that the method for interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules providing the functions of the installation assistance apparatus 100 (such as the acquisition unit 102, the detection unit 104, the determination unit 106, and the output processing unit 108, and a control unit 110 and a display processing unit 112 to be described later). By reading each program module into the memory 1030 and executing the program module by the processor 1020, each function related to the program module is provided. Further, the storage device 1040 may also store data and settings in the installation assistance apparatus 100 or images acquired from the image capture apparatus 200.

A program module may be recorded on a storage medium. The storage medium on which the program module is recorded includes a non-transitory tangible media usable by the computer 1000; and a program code readable by the computer 1000 (processor 1020) may be embedded in the medium.

The input-output interface 1050 is an interface for connecting the computer 1000 to various types of input-output equipment. The input-output interface 1050 also functions as a communication interface performing short-distance wireless communication such as Bluetooth (registered trademark) and/or near field communication (NFC).

The network interface 1060 is an interface for connecting the computer 1000 to a communication network. Examples of the communication network include a local area network (LAN) and a wide area network (WAN). The method for connecting the network interface 1060 to the communication network may be a wireless connection or a wired connection.

Then, the computer 1000 is connected to required equipment (such as the operation terminal 60, the camera 212 in the image capture unit 202, and the lighting unit 222) through the input-output interface 1050 or the network interface 1060.

Each component in the installation assistance apparatus 100 in FIG. 5 is provided by any combination of hardware and software of the computer 1000 in FIG. 6. Then, it should be understood by a person skilled in the art that various modifications to the providing method and the apparatus can be made. A functional block diagram illustrating an installation assistance apparatus 100 according to each example embodiment described below represents a logical function-based block rather than a hardware-based configuration.

The operation terminal 60 starts a predetermined application and connects to the installation assistance apparatus 100 through the communication network 3. On the application, the operation terminal 60 can receive a determination result output from the installation assistance apparatus 100 and cause the determination result to be displayed on the display 62 or be output by voice. Further, the operation terminal 60 may cause the display 62 to display an image captured by the camera 212 in each image capture unit 202 as an image capture view screen on the application.

In another example, the operation terminal 60 may start a predetermined browser and may browse a determination result and a captured image from the camera 212 on the operation terminal 60 by accessing a web page to which the installation assistance apparatus 100 outputs (for example, delivers by streaming) the determination result and the captured image through the communication network 3 such as the Internet.

<Operation Example>

Figure 7:
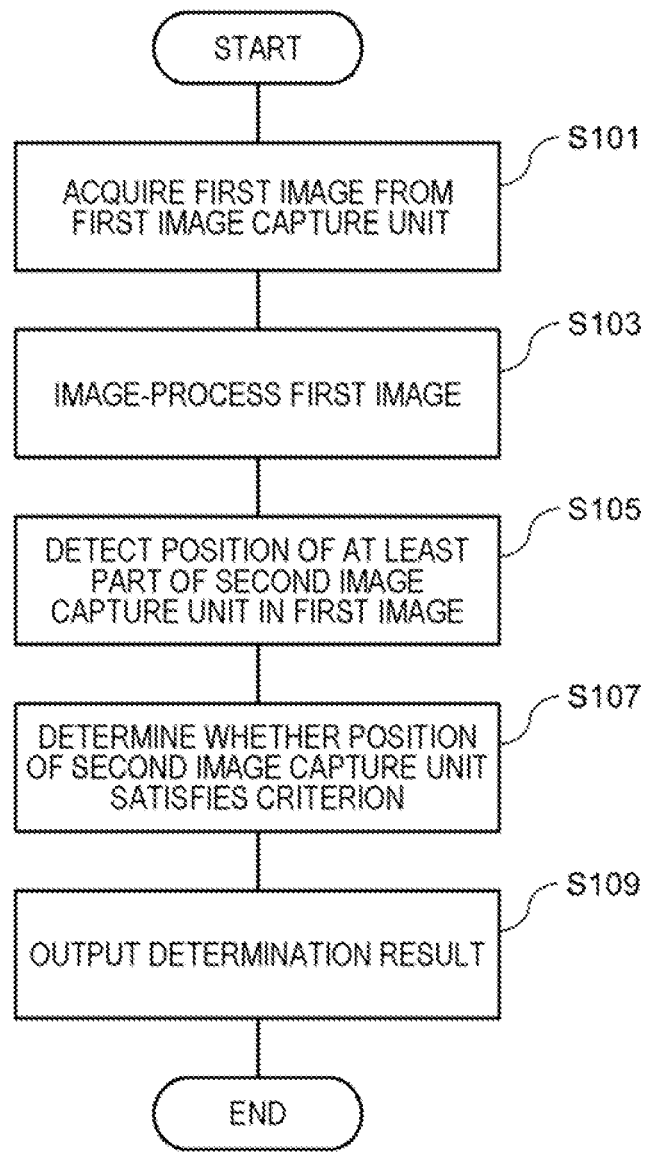
FIG. 7 is a flowchart illustrating an operation example of the installation assistance apparatus according to the example embodiment.

FIG. 7 is a flowchart illustrating an operation example of the installation assistance apparatus 100 according to the present example embodiment.

First, before operating the installation assistance apparatus 100, the operator 10 mounts the first image capture unit 202a and the second image capture unit 202b on the front frames 42 of the article shelf 40. As described above, the second image capture unit 202b is fixed to the front frame 42, and the first image capture unit 202a is position-adjustably mounted on the front frame 42 temporarily, according to the present example embodiment.

Then, when the operator 10 turns on the power to each image capture unit 202, the lighting unit 222 is turned on, and image capture by the camera 212 is started. Furthermore, the operator 10 starts the application by using the operation terminal 60. Then, when the operation terminal 60 is connected to the installation assistance apparatus 100, the flow in FIG. 7 is started. Note that the power to the second image capture unit 202b may or may not be turned on. For example, in a configuration in which notification to the operator 10 is made by using the lighting unit 222 in the second image capture unit 202b, according to a second example embodiment to be described later, the power to the second image capture unit 202b is also turned on. Furthermore, in a configuration in which captured lighting is determined, according to a fourth example embodiment to be described later, the power to the second image capture unit 202b is preferably turned on.

First, the acquisition unit 102 acquires a first image from the first image capture unit 202a (Step S101). At this time, the second image capture unit 202b is captured in the first image. Then, the detection unit 104 transmits the first image to the image processing apparatus 70 and causes the first image to undergo image analysis processing (Step S103). Then, the detection unit 104 detects the position of at least part of the second image capture unit 202b in the first image (Step S105). Then, the determination unit 106 determines whether the position of the second image capture unit 202b satisfies the criterion (Step S107). Then, the output processing unit 108 causes the determination result by the determination unit 106 to be output (Step S109).

This flow may be repeatedly executed during installation work by the operator 10, may not be repeated, or may be executed by combining the two.

In one example, in a case of repeatedly executing the determination processing, when the criterion is not satisfied in the initial round of the determination processing and the criterion is satisfied in determination processing after the installation position is adjusted, the output processing unit 108 may update and output the initial determination result. In this example, the operator 10 can check determination results through adjustment of the installation position. Alternatively, acceptance of a stop operation by the operator 10 may stop this flow being repeatedly executed.

In another example, this flow may be started by accepting a start operation by the operator 10 and be executed once in every start operation. For example, after checking the initial determination result, the operator 10 adjusts the installation position of the first image capture unit 202a. Subsequently, the flow may be executed by performing the start operation again.

According to the present example embodiment, a result of determining whether the criterion is satisfied by the position of at least part of the second image capture unit 202b in a first image captured by the first image capture unit 202a out of the two image capture units 202 is output, and therefore the position of the image capture unit 202 can be adjusted according to the determination result. For example, determination results can be displayed on the display 62 on the operation terminal 60, and therefore the operator 10 can adjust the position through checking of the determination results.

Second Example Embodiment

An installation assistance apparatus 100 according to the present example embodiment is similar to the aforementioned example embodiment except for being configured to control the light emitting state of a lighting unit 222.

<Functional Configuration Example>

Figure 8:
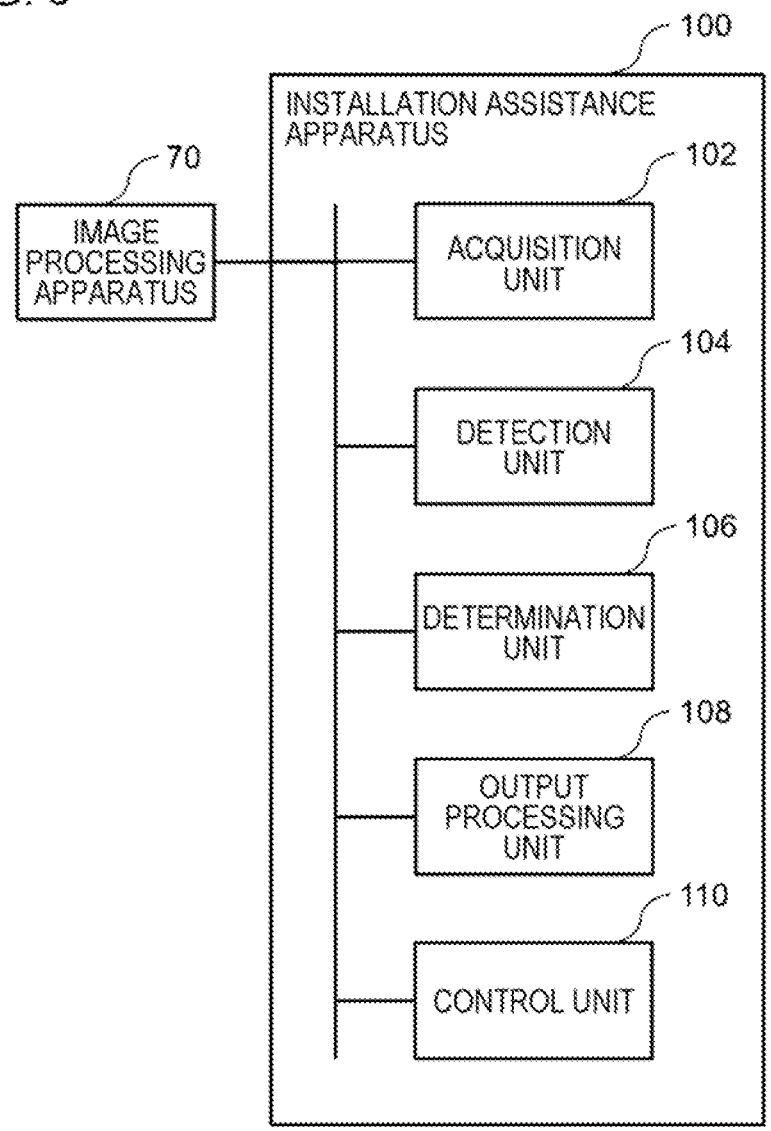
FIG. 8 is a block diagram illustrating an example of a functional configuration of an installation assistance apparatus according to an example embodiment.

FIG. 8 is a block diagram illustrating an example of a functional configuration of the installation assistance apparatus 100 according to the present example embodiment.

The installation assistance apparatus 100 includes an acquisition unit 102, a detection unit 104, a determination unit 106, and an output processing unit 108 that are the same as those in the installation assistance apparatus 100 according to the first example embodiment in FIG. 5 and further includes a control unit 110. The configuration according to the present example embodiment may be combined with at least one of the configurations according to other example embodiments other than the first example embodiment without contradicting each other.

The control unit 110 controls the light emitting state of the lighting unit 222, based on a determination result by the determination unit 106.

While various methods based on a determination result for controlling the light emitting state are considered and examples thereof are described below, the method is not limited thereto. Further, a plurality of the following methods may be combined. Further, the control unit 110 may control the light emitting state of at least one of the lighting units 222 in the first image capture unit 202a and the second image capture unit 202b.

(d1) Changing an amount of emitted light of the lighting unit 222.

For example, when a criterion is satisfied, the amount of emitted light of the lighting unit 222 is set to a first predetermined value or greater, and when the criterion is not satisfied, the amount of emitted light of the lighting unit 222 is set to a second predetermined value less than the first predetermined value.

(d2) Dividing a light emitting unit in the lighting unit 222 into a plurality of areas and outputting light from different light emitting positions.

For example, when the criterion is satisfied, an area positioned at the center of the three areas into which the light emitting unit is divided is turned on, and when the criterion is not satisfied, areas positioned at both ends of the three areas into which the light emitting unit is divided is turned on.

(d3) Changing the number of times light is emitted or a light emission interval of the lighting unit 222.

For example, when the criterion is satisfied, light is emitted once, and when the criterion is not satisfied, the light is emitted a plurality of times. Alternatively, when the criterion is satisfied, light is emitted at least once for a relatively long time, and when the criterion is not satisfied, light emission is repeated a plurality of times in short cycles.

(d4) Changing intervals of light emission and light extinction of the lighting unit 222.

For example, when the criterion is satisfied, light emission and light extinction are repeated at constant intervals, and when the criterion is not satisfied, light emission and light extinction are repeated at different intervals, or light emission and light extinction are repeated at respectively set intervals.

(d5) Selecting a lighting unit 222 being a light emission control target from the two image capture units 202.

For example, when the criterion is satisfied, the lighting unit 222 in one of the image capture units 202 is turned on, and when the criterion is not satisfied, both are turned off. Alternatively, when the criterion is satisfied, the lighting units 222 in both of the image capture units 202 are turned on, and when the criterion is not satisfied, one or both are turned off. Alternatively, when the criterion is satisfied, both are turned on or off, and when the criterion is not satisfied, the lighting units 222 in both image capture units 202 are alternately turned on.

<Operation Example>

Figure 9:
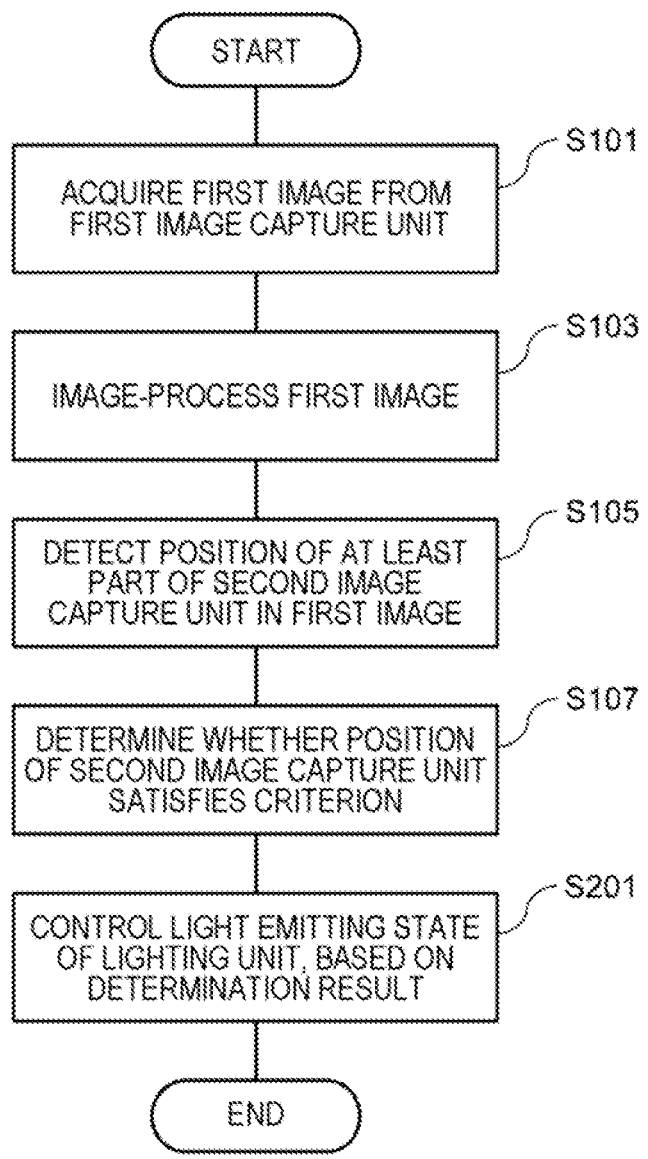
FIG. 9 is a flowchart illustrating an example of operation of the installation assistance apparatus according to the example embodiment.

FIG. 9 is a flowchart illustrating an example of operation of the installation assistance apparatus 100 according to the present example embodiment. The flowchart in FIG. 9 includes Step S101 to Step S107 in the flowchart in FIG. 7 and further includes Step S201 in place of Step S109 in FIG. 7. Note that Step S109 in FIG. 7 may also be executed in parallel.

Based on the determination result in Step S107, the control unit 110 controls the light emitting state of the lighting unit 222 (Step S201).

Similarly to the flow in FIG. 7 in the first example embodiment, this flow may be repeatedly executed during installation work by an operator 10, may not be repeated, or may be executed by combining the two.

According to the present example embodiment, effects similar to those of the aforementioned example embodiment are provided, and furthermore, the operator 10 can determine that the criterion is not satisfied by monitoring the light emitting state of the lighting unit 222, and therefore an operation of the operation terminal 60 is not required. Therefore, movement from an installation location or interruption of installation work can be avoided; and thus work can be smoothly executed, and work efficiency is improved.

Third Example Embodiment

An installation assistance apparatus 100 according to the present example embodiment is similar to the aforementioned example embodiments except for being configured to display a guide indicating an installation position of an image capture unit 202, the guide being superimposed on an image capture view.

<Functional Configuration Example>

Figure 10:
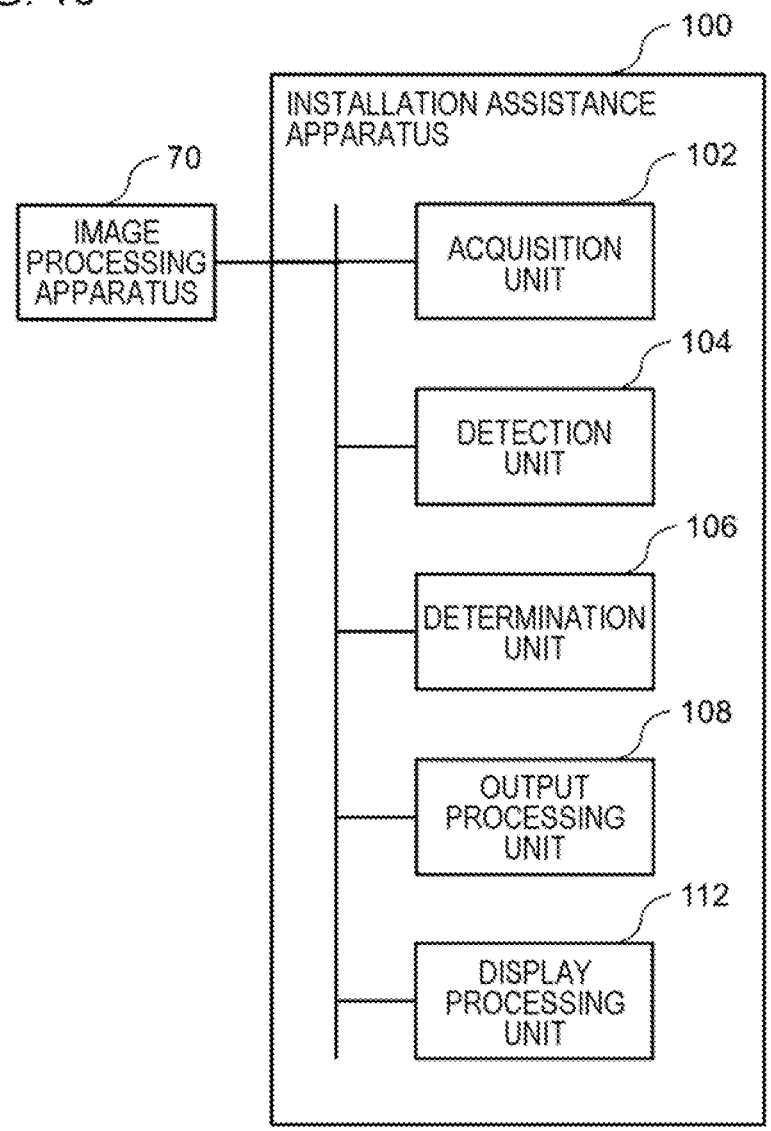
FIG. 10 is a block diagram illustrating an example of a functional configuration of an installation assistance apparatus according to an example embodiment.

FIG. 10 is a block diagram illustrating an example of a functional configuration of the installation assistance apparatus 100 according to the present example embodiment.

The installation assistance apparatus 100 includes an acquisition unit 102, a detection unit 104, a determination unit 106, and an output processing unit 108 that are the same as those in the installation assistance apparatus 100 according to the first example embodiment in FIG. 5 and further includes a display processing unit 112. The configuration according to the present example embodiment may be combined with at least one of the configurations according to other example embodiments other than the first example embodiment without contradicting each other.

While displaying a first image, the display processing unit 112 displays, by superimposition, an image indicating a reference position in the displayed first image.

The reference position is an area including at least part of the image capture unit 202, a lighting unit 222, and a camera 212, and a position being a reference indicating the area. For example, the reference position is at least one of an area surrounding the lighting unit 222, the center position of the lighting unit 222 in a lengthwise direction, an area surrounding the image capture unit 202, and an area surrounding a lens of the camera 212.

An image indicating the reference position may be a frame line indicating an area, a line indicating a center position, or a mark or a marker such as an arrow indicating a position, or may be an image drawn by coloring a relevant area or applying modification processing of highlighting to the area.

While examples of a timing for the display processing unit 112 to display, by superimposition, an image indicating a reference position are described below, the timing is not limited thereto. Further, a plurality of the following timings may be combined.

(e1) After acquiring a first image and determining a reference position by performing image processing by an image processing apparatus 70

(e2) After (e1) described above and after the position of a second image capture unit 202b is determined not to satisfy a criterion by the determination unit 106

(e3) When a display request operation for an image indicating a reference position by an operator 10 is accepted In other words, an image indicating a reference position may be displayed even when a determination result satisfies the criterion, or the image indicating the reference position may not be displayed when the determination result satisfies the criterion.

While examples of a timing for the display processing unit 112 to erase an image indicating a reference position are described below, the timing is not limited thereto.

(f1) After the position of the second image capture unit 202b is determined to satisfy the criterion by the determination unit 106

(f2) When an erasure operation of an image by the operator 10 is accepted

For example, the display processing unit 112 may cause an image capture view screen to display a graphical user interface (GUI) such as operation buttons for displaying an image indicating a reference position and accepting an operation of erasing the image. When depression of an operation button by the operator 10 is accepted, the image indicating the reference position may be displayed on the image capture view screen or may be erased from the image capture view screen.

Furthermore, when the position of the second image capture unit 202b is determined to satisfy the criterion by the determination unit 106, the display processing unit 112 may change a displayed image in such a way that the image indicates that the criterion is satisfied.

For example, when the position of the second image capture unit 202b is determined to satisfy the criterion by the determination unit 106, the display processing unit 112 may change the color of an image indicating the reference position or change a modification method in the modification processing of highlighting. Furthermore, the display processing unit 112 may cause the output processing unit 108 to output information indicating that the position of the second image capture unit 202b satisfies the criterion (that is, a determination result) by the determination unit 106, in combination with the aforementioned example embodiment. For example, a message such as "the image capture unit 202 has entered the reference position" may be displayed on an operation terminal 60 or may be output by voice.

<Operation Example>

Figure 11:
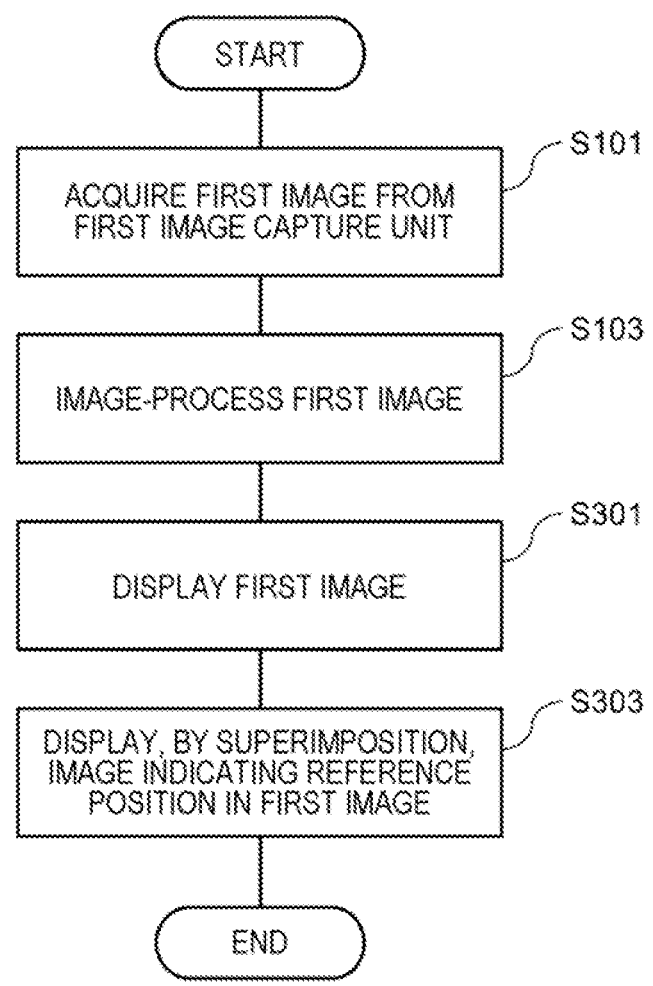
FIG. 11 is a flowchart illustrating an example of operation of the installation assistance apparatus according to the example embodiment.

FIG. 11 is a flowchart illustrating an example of operation of the installation assistance apparatus 100 according to the present example embodiment. The flowchart in FIG. 11 includes Step S101 to Step S103 in the flowchart in FIG. 7 or FIG. 9 and includes Step S301 and Step S303 after Step S103. Note that the processing after Step S103 in at least either of FIG. 7 and FIG. 9 may also be executed in parallel.

After Step S103, the display processing unit 112 causes a display 62 on the operation terminal 60 to display a first image acquired by the acquisition unit 102 in Step S101 (Step S301). Furthermore, by image-processing the first image, the display processing unit 112 determines a reference position in the first image and displays, by superimposition, an image indicating the determined reference position at the reference position (Step S303).

Figure 12:
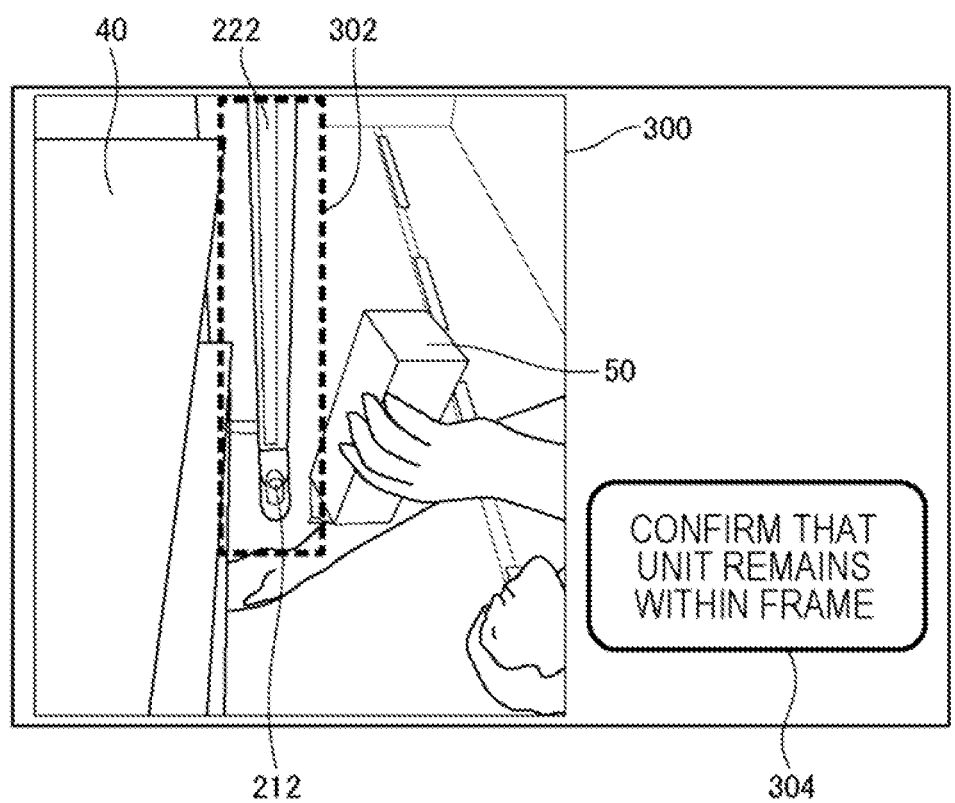
FIG. 12 is a diagram illustrating an example of a screen displayed by a display processing unit.

FIG. 12 is a diagram illustrating an example of a screen 300 displayed by the display processing unit 112. The screen 300 includes a guide frame 302 (indicated by broken lines in the diagram) indicating a reference position, and a message display part 304.

The guide frame 302 indicates an area to be a reference position, that is, a position in a first image within which an image capture unit 202 is to remain. In the example in this diagram, the image capture unit 202 remains within the guide frame 302. For example, a message prompting the operator 10 to confirm that the second image capture unit 202b remains within the guide frame 302 being the reference position in the first image is displayed in the message display part 304. As described above, when the position of the second image capture unit 202b in the first image satisfies the criterion, the message may or may not be displayed. In other words, the message may be displayed only when the position of the second image capture unit 202b in the first image does not satisfy the criterion or may be displayed regardless of the determination result.

Furthermore, for example, the output processing unit 108 may cause a speaker in the operation terminal 60 to voice-process a message prompting the operator 10 to confirm that the second image capture unit 202b remains within the guide frame 302 being the reference position in the first image.

The operator 10 can adjust the position of either one of the image capture units 202 in such a way that the second image capture unit 202b in the first image remains within the reference position (guide frame 302) through monitoring of the screen 300.

Figure 13:
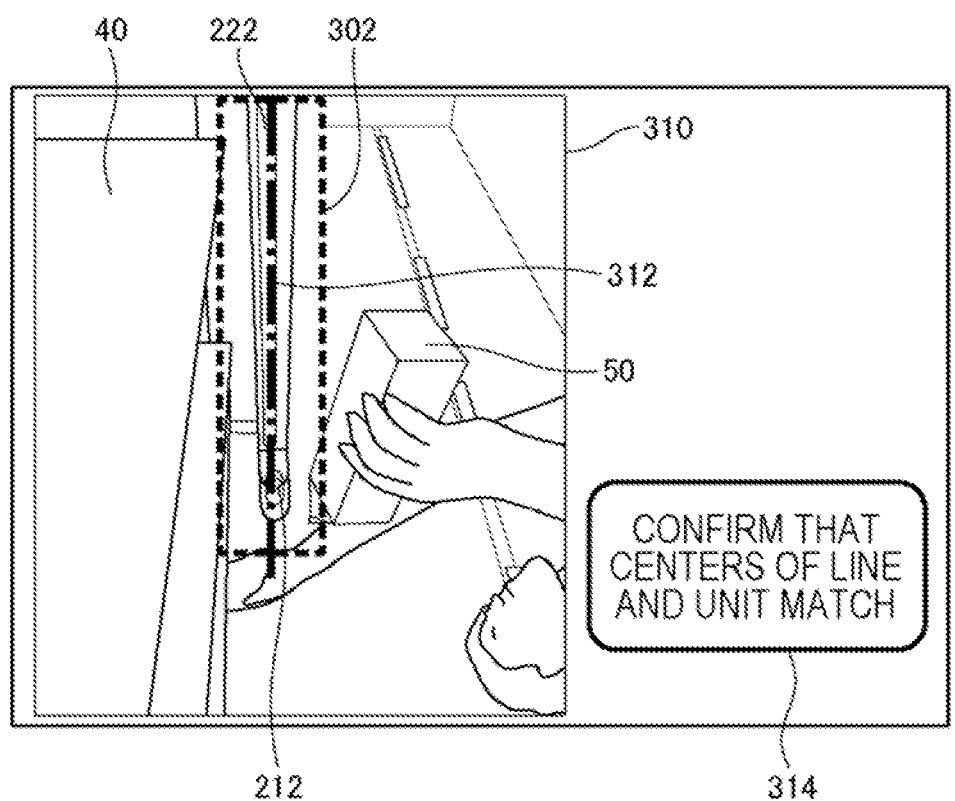
FIG. 13 is a diagram illustrating another example of a screen displayed by the display processing unit.

FIG. 13 is a diagram illustrating another example of a screen 310 displayed by the display processing unit 112. The screen 310 includes a guide frame 302 being the same as the screen 300 in FIG. 12 and further includes a guide line 312 and a message display part 314. Note that the guide frame 302 may not be included in FIG. 13.

The guide line 312 indicates a reference position that should match the center line of the second image capture unit 202b or the lighting unit 222 in a longitudinal direction in a first image. For example, a message prompting the operator 10 to confirm that the center of the second image capture unit 202b in the first image matches the guide line 312 being the reference position is displayed in the message display part 314.

Furthermore, for example, the output processing unit 108 may cause the speaker in the operation terminal 60 to voice process a message prompting the operator 10 to confirm that the center of the second image capture unit 202b in the first image matches the guide line 312 being the reference position.

The operator 10 can adjust the position of either one of the image capture units 202 in such a way that the center of the second image capture unit 202b in the first image matches the reference position (guide line 312) through monitoring of the screen 300.

Which of the screens in FIG. 12 and FIG. 13 is to be displayed may be changed by accepting an operation on each screen. Alternatively, selection may be accepted on a setting screen or an operation menu displayed on the operation terminal 60.

Further, when the criterion is determined to be satisfied in the determination processing by the determination unit 106 in FIG. 7 or FIG. 9, the determination processing being executed in parallel with this processing, the output processing unit 108 may output the determination result, and, at the same time, the display processing unit 112 may erase the image indicating the reference position displayed by superimposition on the first image. Alternatively, the display processing unit 112 may redraw the image indicating the reference position displayed in the first image by changing the color, the line type, and/or the modification processing of the image.

According to the present example embodiment, effects similar to those of the aforementioned example embodiments are provided, and furthermore, an image guiding a reference position being at least part of the second image capture unit 202b in a first image is displayed, and therefore the operator 10 can adjust the position of the image capture unit 202 in accordance with the guide.

Fourth Example Embodiment

An installation assistance apparatus 100 according to the present example embodiment is similar to the aforementioned example embodiment except for detecting and notifying that lighting on the ceiling or the like is captured in an image captured from the lower side. As a precondition, the installation assistance apparatus 100 according to the present example embodiment assists adjustment work at installation of an image capture apparatus 200 in an environment in which the image capture apparatus 200 is actually used (such as the position and the illuminance of lighting). The present example embodiment will be described below by using the functional block diagram according to the third example embodiment in FIG. 10. The configuration according to the present example embodiment may be combined with at least one of the configurations according to other example embodiments other than the third example embodiment without contradicting each other.

<Functional Configuration Example>

A determination unit 106 determines whether an image captured from the lower side includes an area with a luminance equal to or greater than a reference.

An output processing unit 108 further outputs a determination result by the determination unit 106.

Lighting on the ceiling or the like may be captured in a first image captured from the lower side by a camera 212a in a first image capture unit 202a. When lighting is captured, an image area in the part may cause blown-out highlights and may become a factor in degrading precision of object recognition, and therefore adjustment is required in advance. Specifically, for example, there is a need for changing the illuminance and the irradiation direction of lighting, extinguishing lighting at the relevant spot, avoiding captured lighting by changing the angle of view of the camera 212, filtering a lens of the camera 212, and adjusting the exposure of the camera 212 [setting an International Organization for Standardization (ISO) speed and a frame rate].

Whether lighting is captured can be detected by whether an image includes an area with a luminance equal to or greater than the reference. An area with a luminance equal to or greater than the reference refers to an area with each of luminance values of the image for red (R), green (G), and blue (B) in the image reaching 255. Alternatively, the area may refer to a high-luminance area with a luminance difference in an image being equal to or greater than a threshold value.

While various specific determination methods can be considered and examples thereof are described below, the method is not limited thereto. Further, a plurality of the following methods may be combined. Conditions for determining that lighting is captured are listed below. Note that an "image" refers to at least an area affecting object recognition in a first image. In other words, an area not affecting object recognition in the first image may be excluded.

(g1) An area with a luminance equal to or greater than a reference exists besides an area with a luminance in an image being equal to or greater than the reference when a lighting unit 222 is turned on.

(g2) A high-luminance area with a luminance difference in an image being equal to or greater than a threshold value exists besides an area with a luminance equal to or greater than the reference in the image when the lighting unit 222 is turned on.

(g3) The number of pixels in the area existing in (g1) or (g2) described above is equal to or greater than a predetermined value.

Settings of the determination conditions described above may be changed as appropriate according to an environment of an installation location. For example, an operator 10 or an administrator may set the conditions on a setting screen (unillustrated) displayed on an operation terminal 60.

The output processing unit 108 outputs information indicating that lighting other than that from the lighting unit 222 is captured in an image as a determination result by the determination unit 106. For example, the output processing unit 108 may output a message notifying the operator 10 that neighboring lighting is captured in an image.

Furthermore, the display processing unit 112 may display, by superimposition, information indicating the position of lighting captured in an image on a first image displayed on a display 62 on the operation terminal 60. For example, an image indicating the position of the lighting may be drawn, by superimposition, on an image capture view screen of the first image. For example, the drawn image may be an arrow pointing to the position of the lighting or a frame surrounding an area of the lighting, or may be an image drawn by applying coloring or modification processing (such as blinking) of highlighting to at least either one of the position of the lighting and an area around the position.

<Operation Example>

Figure 14:
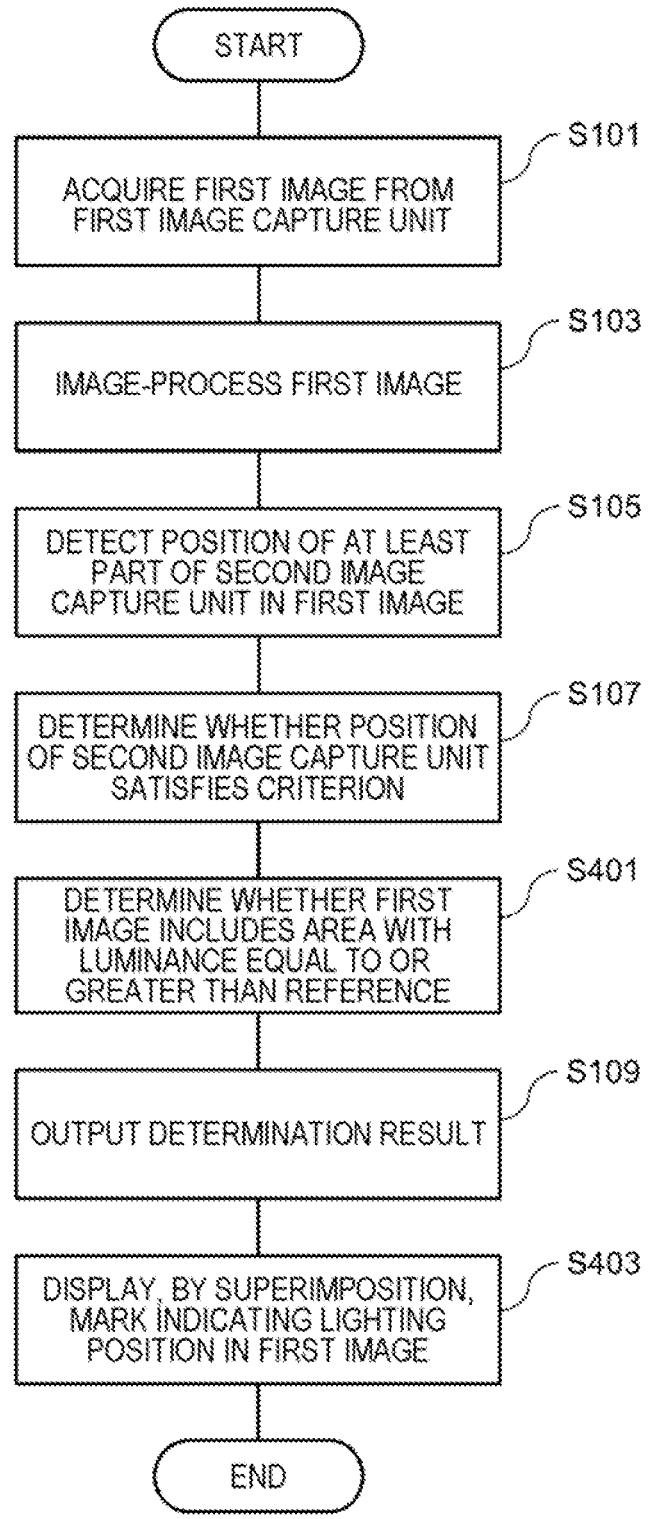
FIG. 14 is a flowchart illustrating an operation example of an installation assistance apparatus according to an example embodiment.

FIG. 14 is a flowchart illustrating an operation example of the installation assistance apparatus 100 according to the present example embodiment. The flowchart in FIG. 14 includes Step S101 to Step S109 in the flowchart in FIG. 7 and further includes Step S401 and Step S403. Note that Step S201 in the flowchart in FIG. 9 may further be included.

First, after Step S107 in FIG. 7, the determination unit 106 determines whether a first image captured from the lower side includes an area with a luminance equal to or greater than the reference (Step S401). Then, the output processing unit 108 outputs the determination results by the determination unit 106 in Step S107 and Step S401 (Step S109).

Furthermore, the display processing unit 112 causes the display 62 on the operation terminal 60 to display the first image acquired by the acquisition unit 102 in Step S101 (Step S403). Furthermore, by image-processing the first image, the display processing unit 112 determines a reference position in the first image and causes an image indicating the determined reference position to be displayed by superimposition at the reference position.

Figure 15:
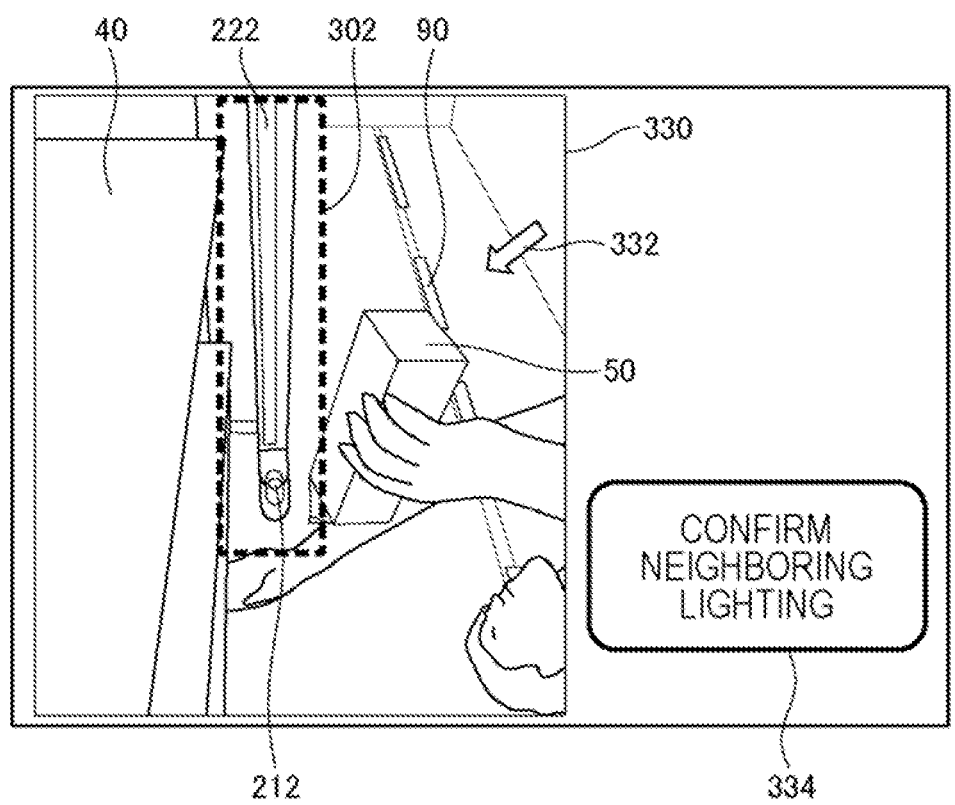
FIG. 15 is a diagram illustrating a display example of a screen when a determination result is output to an operation terminal.

FIG. 15 is a diagram illustrating a display example of a screen 330 when a determination result is output to the operation terminal 60. The screen 330 is displayed on the display 62 on the operation terminal 60 by the display processing unit 112. The first image captured by the camera 212a is displayed on the screen 330. The displayed image may be an image capture view of a video image captured in real time, or an already captured static image or dynamic image.

Further, a guide frame 302 displayed in Step S303 in the flowchart in FIG. 11 is displayed on the screen 330 in FIG. 15.

The screen 330 includes an icon 332 such as an arrow indicating the position of lighting, and a message display part 334. In this example, the icon 332 is an arrow pointing to the position of captured lighting 90, as a result of determination by the determination unit 106. An image of the arrow is drawn on the first image by superimposition. A message notifying that the lighting 90 is captured is displayed in the message display part 334.

Furthermore, the output processing unit 108 may output a message voice or a notification sound for notifying that the lighting 90 is captured from a speaker in the operation terminal 60 or may activate a vibrator in the operation terminal 60.

In an example combined with the configuration according to the second example embodiment, the light emitting state of the lighting unit 222 may be controlled by a control unit 110, based on a determination result.

According to the present example embodiment, effects similar to those of the aforementioned example embodiments are provided, and whether an area in which lighting 90 is captured (an area with a luminance equal to or greater than a reference) exists in a first image is further determined, and the determination result is displayed. Consequently, the operator 10 can recognize that the lighting 90 is captured and therefore can take a countermeasure in a use environment of the image capture apparatus 200 and can prevent degraded image analysis processing precision due to the captured lighting 90 in the first image.

While the example embodiments of the present invention have been described above with reference to the drawings, the example embodiments are exemplifications of the present invention, and various configurations other than those described above may be employed. For example, the display processing unit 112 may cause the display 62 on the operation terminal 60 to display a screen 320 including both of images captured by the cameras 212 in the two image capture units 202.

FIG. 16 is a diagram illustrating an example of the screen 320 including both of images captured by the cameras 212 in the two image capture units 202. A display part 322 of a second image captured by a camera 212b in a second image capture unit 202b and a display part 324 of a first image captured by the camera 212a in the first image capture unit 202a are displayed side by side on the screen 320. The guide frame 302 or the guide line 312 (unillustrated in FIG. 16) displayed in the third example embodiment may be displayed in each display part on the screen 320.

A scene of a person taking out an object 50 from an article shelf 40 is captured in each image. In the two images, the images received from respective image capture units 202 may be displayed at any time or may be displayed in a time synchronized manner based on time stamps of the images. Alternatively, the images may be displayed with time information without time synchronization. Operation buttons (unillustrated) for playing back, stopping, rewinding, and fast-forwarding a video image may be displayed on the screen 320, an operation by the operator 10 may be accepted, and a playback operation of the video image may be performed in accordance with the operation.

While the present invention has been described with reference to example embodiments and examples thereof, the present invention is not limited to the aforementioned example embodiments and examples. Various changes and modifications that may be understood by a person skilled in the art may be made to the configurations and details of the present invention without departing from the scope of the present invention.

The whole or part of the example embodiments disclosed above may also be described as, but not limited to, the following supplementary notes.

1. An installation assistance apparatus including:
    an acquisition unit that acquires a first image from a first image capture apparatus out of the first image capture apparatus and a second image capture apparatus that are placed in such a way as to face each other in a plan view;
    a detection unit that detects a position of at least part of the second image capture apparatus in the first image by processing the first image;
    a determination unit that determines whether the position of the second image capture apparatus satisfies a criterion; and
    an output processing unit that causes a determination result by the determination unit to be output.

2. The installation assistance apparatus according to 1., further including
    a control unit that controls a light emitting state of a lighting apparatus, based on the determination result.

3. The installation assistance apparatus according to 1. or 2., wherein
    one of the first image capture apparatus and the second image capture apparatus is installed in such a way as to capture an image in a downward direction from an upper side, and another is installed in such a way as to capture an image in an upward direction from a lower side.

4. The installation assistance apparatus according to 3., wherein
    the determination unit determines whether an image captured from the lower side includes an area with a luminance equal to or greater than a reference, and
    the output processing unit further outputs a determination result by the determination unit.

5. The installation assistance apparatus according to any one of 1. to 4., wherein
    the detection unit further detects a position of at least part of the first image capture apparatus in a second image of the second image capture apparatus by acquiring the second image and processing the second image,
    the determination unit determines whether the position of the first image capture apparatus satisfies a criterion, and
    the output processing unit outputs a determination result by the determination unit.

6. The installation assistance apparatus according to any one of 1. to 5., further including
    a display processing unit that, while causing the first image to be displayed, causes an image indicating a reference position to be displayed by superimposition in the displayed first image.

7. The installation assistance apparatus according to any one of 1. to 6., wherein
    the detection unit further detects a size of at least part of at least one of the first image capture apparatus and the second image capture apparatus,
    the determination unit determines whether the size satisfies a criterion, and
    the output processing unit outputs a determination result by the determination unit.

8. An installation assistance method including, by an installation assistance apparatus:
    acquiring a first image from a first image capture apparatus out of the first image capture apparatus and a second image capture apparatus that are placed in such a way as to face each other in a plan view;
    detecting a position of at least part of the second image capture apparatus in the first image by processing the first image;
    determining whether the position of the second image capture apparatus satisfies a criterion; and
    causing the determination result to be output.

9. The installation assistance method according to 8., further including, by the installation assistance apparatus,
    controlling a light emitting state of a lighting apparatus, based on the determination result.

10. The installation assistance method according to 8. or 9., wherein one of the first image capture apparatus and the second image capture apparatus is installed in such a way as to capture an image in a downward direction from an upper side, and another is installed in such a way as to capture an image in an upward direction from a lower side.

11. The installation assistance method according to 10., further including, by the installation assistance apparatus:
determining whether an image captured from the lower side includes an area with a luminance equal to or greater than a reference; and
further outputting the determination result.

12. The installation assistance method according to any one of 8. to 11., further including, by the installation assistance apparatus:
detecting a position of at least part of the first image capture apparatus in a second image of the second image capture apparatus by acquiring the second image and processing the second image;
determining whether the position of the first image capture apparatus satisfies a criterion; and
outputting the determination result.

13. The installation assistance method according to any one of 8. to 12., further including, by the installation assistance apparatus,
while causing the first image to be displayed, causing an image indicating a reference position to be displayed by superimposition in the displayed first image.

14. The installation assistance method according to any one of 8. to 13., further including, by the installation assistance apparatus:
detecting a size of at least part of at least one of the first image capture apparatus and the second image capture apparatus;
determining whether the size satisfies a criterion; and
outputting the determination result.

15. A program for causing a computer to execute:
a procedure for acquiring a first image from a first image capture apparatus out of the first image capture apparatus and a second image capture apparatus that are placed in such a way as to face each other in a plan view;
a procedure for detecting a position of at least part of the second image capture apparatus in the first image by processing the first image;
a procedure for determining whether the position of the second image capture apparatus satisfies a criterion; and
a procedure for causing the determination result to be output.

16. The program according to 15., further causing the computer to execute
a procedure for controlling a light emitting state of a lighting apparatus, based on the determination result.

17. The program according to 15. or 16., wherein
one of the first image capture apparatus and the second image capture apparatus is installed in such a way as to capture an image in a downward direction from an upper side, and another is installed in such a way as to capture an image in an upward direction from a lower side.

18. The program according to 17., further causing the computer to execute:
a procedure for determining whether an image captured from the lower side includes an area with a luminance equal to or greater than a reference; and
a procedure for further outputting the determination result.

19. The program according to any one of 15. to 18., further causing the computer to execute:
a procedure for further detecting a position of at least part of the first image capture apparatus in a second image of the second image capture apparatus by acquiring the second image and processing the second image;
a procedure for determining whether the position of the first image capture apparatus satisfies a criterion; and
a procedure for outputting the determination result.

20. The program according to any one of 15. to 19., further causing the computer to execute
a procedure for, while causing the first image to be displayed, causing an image indicating a reference position to be displayed by superimposition in the displayed first image.

21. The program according to any one of 15. to 20., further causing the computer to execute:
a procedure for further detecting a size of at least part of at least one of the first image capture apparatus and the second image capture apparatus;
a procedure for determining whether the size satisfies a criterion; and
a procedure for outputting the determination result.

REFERENCE SIGNS LIST

3 Communication network
10 Operator
40 Article shelf
42 Front frame
60 Operation terminal
62 Display
70 Image processing apparatus
90 Lighting
100 Installation assistance apparatus
102 Acquisition unit
104 Detection unit
106 Determination unit
108 Output processing unit
110 Control unit
112 Display processing unit
200 Image capture apparatus
202 Image capture unit
202a First image capture unit
202b Second image capture unit
210 Image capturing unit housing
212, 212a, 212b Camera
220 Lighting unit housing
222 Lighting unit
300 Screen
302 Guide frame
304 Message display part
310 Screen
312 Guide line
314 Message display part
330 Screen
332 Icon
334 Message display part
1000 Computer
1010 Bus
1020 Processor 1030 Memory
1040 Storage device
1050 Input-output interface
1060 Network interface

What is claimed is:

1. An installation assistance apparatus comprising:
at least one memory configured to store instructions; and
at least one processor configured to execute the instructions to:
acquire a first image from a first image capture apparatus out of the first image capture apparatus and a second image capture apparatus that are placed in such a way as to face each other in a plan view;
detect a position of at least part of the second image capture apparatus in the first image by processing the first image;
determine whether the position of the second image capture apparatus satisfies a criterion; and
cause a determination result, which is determined, to be output, wherein
the criterion includes that a lens of a camera of the second image capture apparatus is included in a predetermined area at a predetermined position in the first image,
the determination result includes at least one type of information out of information indicating that the criterion is satisfied and information indicating that the criterion is not satisfied, and
the at least one processor is further configured to execute the instructions to repeatedly perform determination processing and output the determination result including the information to notify an operator of the information, during executing installation work of the first image capture apparatus and the second image capture apparatus.

2. The installation assistance apparatus according to claim 1,
wherein the at least one processor is further configured to execute the instructions to
control a light emitting state of a lighting unit of at least one of the first image capture apparatus and the second image capture apparatus, based on the determination result.

3. The installation assistance apparatus according to claim 2, wherein
the at least one processor is further configured to execute the instructions to
control the light emitting state of the lighting unit of at least one of the first image capture apparatus and the second image capture apparatus to be changed between when the criterion is satisfied and when the criterion is not satisfied.

4. The installation assistance apparatus according to claim 1, wherein
one of the first image capture apparatus and the second image capture apparatus is installed in such a way as to capture an image in a downward direction from an upper side, and another is installed in such a way as to capture an image in an upward direction from a lower side.

5. The installation assistance apparatus according to claim 4, wherein
the at least one processor is further configured to execute the instructions to:
determine whether an image captured from the lower side includes an area with a luminance equal to or greater than a reference, and
further output a determination result which is determined.

6. The installation assistance apparatus according to claim 5, wherein
the determination result includes information indicating that neighboring lighting is captured in at least a part of the first image.

7. The installation assistance apparatus according to claim 4, wherein
the first image capture apparatus and the second image capture apparatus respectively include the camera, an image capturing unit housing in which the camera housed, a lighting unit which extends in a vertical direction when the first image capture apparatus and the second image capture apparatus are installed, and a lighting unit housing in which the lighting unit is housed, and
the camera is provided at one end of the lighting unit, and has a direction in which light of the lighting unit is emitted as an image capture area.

8. The installation assistance apparatus according to claim 7, wherein
the first image capture apparatus and the second image capture apparatus are installed such that the up-down positions of the cameras thereof are reversed with respect to each other in the plan view.

9. The installation assistance apparatus according to claim 1, wherein the at least one processor is further configured to execute the instructions to:
further detect a position of at least part of the first image capture apparatus in a second image of the second image capture apparatus by acquiring the second image and processing the second image,
determine whether the position of the first image capture apparatus satisfies a criterion, and
output a determination result which is determined.

10. The installation assistance apparatus according to claim 9, wherein the at least one processor is further configured to execute the instructions to
output the determination result which is determined using at least one of the first image and the second image, after the operator fixed one of the first image capture apparatus and the second image capture apparatus and during the operator adjusts of an installation position of the other of the first image capture apparatus and the second image capture apparatus.

11. The installation assistance apparatus according to claim 1, wherein the at least one processor is further configured to execute the instructions to
while causing the first image to be displayed, cause an image indicating a reference position to be displayed by superimposition in the displayed first image.

12. The installation assistance apparatus according to claim 1, wherein the at least one processor is further configured to execute the instructions to:
further detect a size of at least one component out of a lighting unit, the camera, and the lens of the camera of the second image capture apparatus in the first image,
the criterion is a size of a component is included in a predetermined range related to the component,
determine whether the size satisfies a criterion, and
output a determination result which is determined.

13. The installation assistance apparatus according to claim 1, wherein
the criterion includes that at least part of a lighting unit and the camera in the second image capture apparatus is included in a predetermined area at a predetermined position in the first image.

14. The installation assistance apparatus according to claim 1, wherein
the criterion includes that an area of light emitted from a lighting unit in the second image capture apparatus is equal to or greater than a predetermined value.

15. The installation assistance apparatus according to claim 1, wherein
the at least one processor is further configured to execute the instructions to
in a case where the criterion is satisfied, notify the operator that installation is complete, and in a case where the criterion is not satisfied, notify the operator that adjustment is required.

16. The installation assistance apparatus according to claim 1, wherein an output unit to which the determination result is to be output includes at least one of a display unit, a speaker, and a vibration unit of an operation terminal which is used by the operator.

17. An installation assistance method comprising, by an installation assistance apparatus:
acquiring a first image from a first image capture apparatus out of the first image capture apparatus and a second image capture apparatus that are placed in such a way as to face each other in a plan view;
detecting a position of at least part of the second image capture apparatus in the first image by processing the first image;
determining whether the position of the second image capture apparatus satisfies a criterion;
causing a determination result to be output, wherein
the criterion includes that a lens of a camera of the second image capture apparatus is included in a predetermined area at a predetermined position in the first image, and
the determination result includes at least one type of information out of information indicating that the criterion is satisfied and information indicating that the criterion is not satisfied; and
repeatedly performing determination processing and outputting the determination result including the information to notify an operator of the information, during executing installation work of the first image capture apparatus and the second image capture apparatus.

18. A non-transitory computer-readable storage medium storing a program for causing a computer to execute:
a procedure for acquiring a first image from a first image capture apparatus out of the first image capture apparatus and a second image capture apparatus that are placed in such a way as to face each other in a plan view;
a procedure for detecting a position of at least part of the second image capture apparatus in the first image by processing the first image;
a procedure for determining whether the position of the second image capture apparatus satisfies a criterion;
a procedure for causing a determination result to be output, wherein
the criterion includes that a lens of a camera of the second image capture apparatus is included in a predetermined area at a predetermined position in the first image, and
the determination result includes at least one type of information out of information indicating that the criterion is satisfied and information indicating that the criterion is not satisfied; and
a procedure for repeatedly performing determination processing and outputting the determination result including the information to notify an operator of the information, during executing installation work of the first image capture apparatus and the second image capture apparatus.

* * * * *